(No Model.)

I. F. BASSFORD.
AXLE NUT LOCKING DEVICE.

No. 579,553. Patented Mar. 23, 1897.

Witnesses.
A. H. Keeney
Anna V. Faust

Inventor.
Isaac F. Bassford
By Benedict & Morsell
Attorneys.

THE NORRIS PETERS CO., PHOTO-LITHO., WASHINGTON, D. C.

UNITED STATES PATENT OFFICE.

ISAAC F. BASSFORD, OF MILWAUKEE, WISCONSIN, ASSIGNOR OF ONE-HALF TO JOHN B. ZAUN, OF SAME PLACE.

AXLE-NUT-LOCKING DEVICE.

SPECIFICATION forming part of Letters Patent No. 579,553, dated March 23, 1897.

Application filed August 29, 1896. Serial No. 604,289. (No model.)

*To all whom it may concern:*

Be it known that I, ISAAC F. BASSFORD, of Milwaukee, in the county of Milwaukee and State of Wisconsin, have invented a new and useful Improvement in Axle-Nut-Locking Devices, of which the following is a description, reference being had to the accompanying drawings, which are a part of this specification.

The object of my invention is, in wheeled vehicles, to provide improved means for securing the wheel-retaining or axle nut to the axle; and this I accomplish by devices that are in part automatic and inclosed within the axle and the nut thereon, and all of which are reliable and sufficiently strong and enduring in their several parts to properly adapt them for their several functions.

The invention consists of the devices and their several parts and combinations of parts, as hereinafter described and claimed, or their equivalents.

Figure 1:
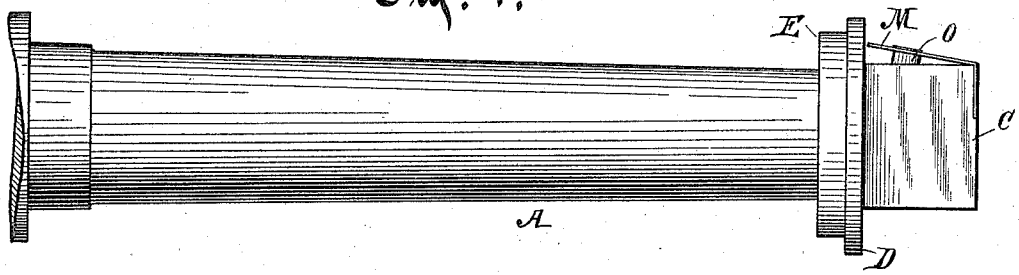
Figure 2:
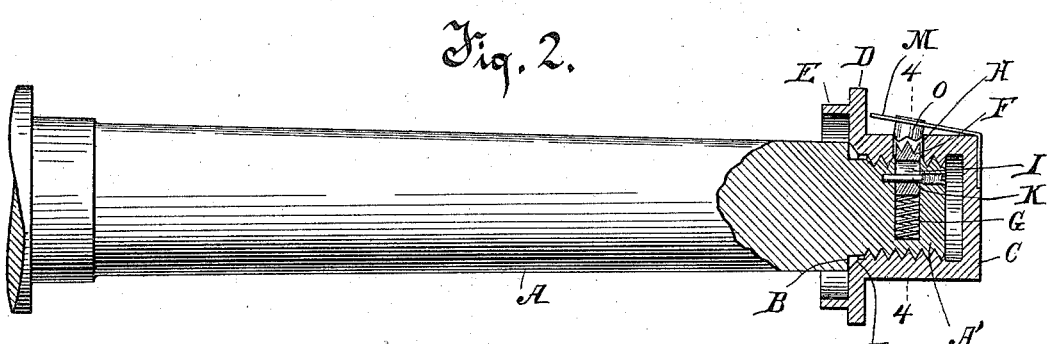
Figure 3:
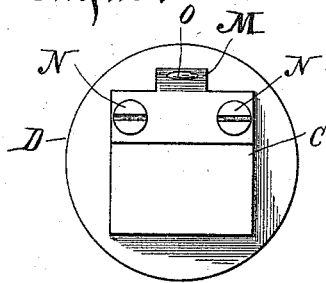
Figure 4:
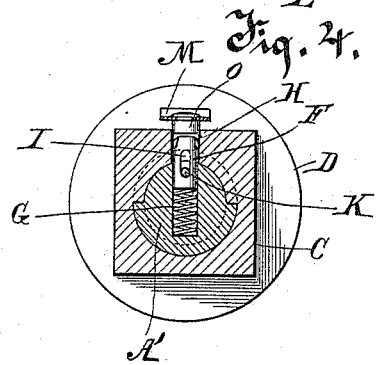
Figure 5:
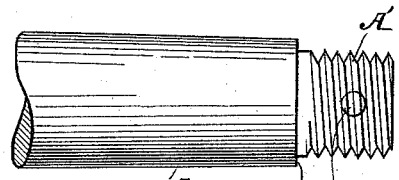

In the drawings, Figure 1 is a side elevation of the spindle of an axle with its nut thereon having my improved devices embodied therewith. Fig. 2 is a side elevation of the same spindle and nut shown in Fig. 1, the outer end of the spindle being broken away and the extremity of the spindle and the nut thereon being in central vertical section, showing my improved devices in connection therewith. Fig. 3 is an outer end view of the nut with a part of my improved device thereon. Fig. 4 is a transverse section on line 4 4 of Fig. 2. Fig. 5 is a top plan view of an end portion of the spindle.

In the drawings, A is the spindle of an axle, here shown as being solid and preferably made of steel.) This axle at its outer extremity terminates in a contracted portion A', which diametrically-contracted portion is screw-threaded. The junction of the part A' with the body portion of the spindle A is marked by the annular shoulder B. The wheel-retaining nut C turns on the part A' and when brought to its seat bears against the shoulder B. The nut is provided with a radially-projecting flange D, which flange is provided with an annular axially-projecting hood or guard E.

For securing or locking the nut C on the spindle of the axle when the nut is brought to its seat thereon I provide a pin F, movable radially in a recess or socket therefor in the part A'. A spring G in the socket beneath the pin is adapted to lift the pin or push it outwardly beyond the surface of the part A' of the spindle and hold it yieldingly in such position. The nut C is provided with a transverse aperture H through one side of it, which aperture is of a size and form to just receive the pin F therein, and the aperture is so located in the nut as, when the nut is turned onto the part A' to its seat, to come directly opposite the pin F, which pin is thereupon by the action of the spring G forced outwardly into the aperture in the nut, and the nut is thereby prevented from rotating or unscrewing on the spindle until the pin F is pushed inwardly away from contact with the nut by application of external force. The pin F is provided with a transverse slot I, through which a retaining-pin K is inserted, the pin K being screw-threaded near its outer end and being turned into the end of the spindle therefor.

The slot I is elongated to such extent and the parts are so related to each other that the pin F may be pushed down into its socket in the spindle until its outer surface is flush with the surface of the spindle, and upon being relieved of the force that pushes it into its socket in the spindle it will be forced outwardly by the spring G into the aperture H in the nut, engaging the nut and preventing its rotation, as aforesaid. The pin K limits the endwise movement of the pin F and prevents its escape from the spindle, and also retains the pin F in position against displacement revolubly. The top or outer end of the pin F is grooved or channeled homogeneously with the screw-thread of the part A', as shown in Figs. 2 and 5, so that when the head of the pin is flush with the surface of the spindle the nut C turns on the spindle and over the end of the pin. The form of these channels across the outer surface of the end of the pin is such that the thread of the nut C, which nut is slightly beveled, as shown at L, at the beginning of the thread, will readily take onto the end of the pin F when the pin is in the elevated position shown in Fig. 2, as the nut is turned onto the part A', and automatically push the pin down into its socket in the spindle as the nut advances on the spindle and onto and over the pin.

When it is desired to remove the nut C from the spindle, it is necessary to force the pin F down into its socket out of engagement with the nut to permit the nut to be unscrewed over and past the pin. To accomplish this and to have a device always ready for the purpose, I provide an elastic finger M, conveniently made of a strip of steel, which finger is secured to the nut C, conveniently by screws N N. The finger extends over the aperture H and is provided with a knob or plunger O, fitting loosely into the aperture H and held normally away from pin F in the position shown in Fig. 2, which plunger is adapted to depress the elastic finger M to contact with the pin F and force it down into its socket flush with the surface of the spindle and out of engagement with the nut, so that the nut can be unscrewed over it. The finger M and plunger O are not necessary parts of my invention, but are advisably used in connection therewith as a convenient means for depressing the locking-pin F, and also because the plunger O is adapted to close the aperture H and prevent undesirable foreign matter from getting into it.

What I claim as my invention is—

1. The combination with a spindle provided with a screw-threaded extremity and a transverse socket therein, of a locking-pin movable endwise in the socket, a spring in the socket beneath the pin adapted to force the pin outwardly yieldingly, a retaining-pin inserted releasably in the spindle through a slot therefor in the locking-pin limiting endwise and preventing revoluble movement of the locking-pin, and a nut provided with an aperture adapted to receive the locking-pin, the nut being adapted to turn onto the spindle.

2. The combination with a spindle provided with a transversely-movable locking-pin, of a nut provided with a transverse aperture through one side thereof, and an elastic finger secured to the nut and provided with a plunger adapted to enter the aperture in the nut and to push the locking-pin therefrom.

In testimony whereof I affix my signature in presence of two witnesses.

ISAAC F. BASSFORD.

Witnesses:
C. T. BENEDICT,
ANNA V. FAUST.